United States Patent
Greenblat

(10) Patent No.: US 9,514,060 B2
(45) Date of Patent: Dec. 6, 2016

(54) DEVICE, SYSTEM AND METHOD OF ACCESSING DATA STORED IN A MEMORY

(75) Inventor: Ilia Greenblat, Kfar Saba (IL)

(73) Assignee: Entropic Communications, LLC, Carlsbad, CA (US)

( * ) Notice: Subject to any disclaimer, the term of this patent is extended or adjusted under 35 U.S.C. 154(b) by 1267 days.

(21) Appl. No.: 12/182,100

(22) Filed: Jul. 29, 2008

(65) Prior Publication Data

US 2010/0030972 A1 Feb. 4, 2010

(51) Int. Cl.
*G06F 12/08* (2016.01)
*G06F 12/12* (2016.01)
*G06F 12/10* (2016.01)

(52) U.S. Cl.
CPC .......... *G06F 12/12* (2013.01); *G06F 12/1027* (2013.01); *G06F 12/1081* (2013.01); *G06F 12/0802* (2013.01)

(58) Field of Classification Search
None
See application file for complete search history.

(56) References Cited

U.S. PATENT DOCUMENTS

| | | | |
|---|---|---|---|
| 5,974,421 A * | 10/1999 | Krishnaswamy et al. | |
| 6,466,470 B1 * | 10/2002 | Chang | G11C 7/20 365/154 |
| 6,526,474 B1 * | 2/2003 | Ross | G11C 15/04 711/108 |
| 6,560,670 B1 | 5/2003 | Ichiriu | |
| 6,651,143 B2 * | 11/2003 | Mounes-Toussi | 711/138 |
| 6,778,984 B1 * | 8/2004 | Lu et al. | |
| 6,792,502 B1 | 9/2004 | Pandya et al. | |
| 6,912,638 B2 * | 6/2005 | Hellman et al. | 711/167 |
| 7,058,757 B1 * | 6/2006 | Branth et al. | 711/108 |
| 7,228,378 B1 * | 6/2007 | Pereira | G11C 15/00 365/49.15 |
| 2003/0005116 A1 * | 1/2003 | Chase | H04L 29/06 709/225 |
| 2004/0123024 A1 * | 6/2004 | King | 711/108 |
| 2006/0288129 A1 * | 12/2006 | Pope et al. | 710/22 |
| 2007/0260733 A1 | 11/2007 | Havemose et al. | |
| 2009/0235283 A1 | 9/2009 | Kim et al. | |

\* cited by examiner

*Primary Examiner* — Duc Doan
(74) *Attorney, Agent, or Firm* — McAndrews, Held & Malloy, Ltd.

(57) ABSTRACT

Device, system and method of accessing data stored in a memory. For example, a device may include a memory to store a plurality of data items to be accessed by a processor; a cache manager to manage, a cache within the memory, the cache including a plurality of pointer entries, wherein each pointer entry includes an identifier of a respective data item and a pointer to an address of the data item; and a search module to receive from the cache manager an identifier of a requested data item, search the plurality of pointer entries for the identifier of the requested data item and, if a pointer entry is detected to include an identifier of a respective data item that matches the identifier of the requested data item then, provide the cache manager with the pointer from the detected entry. Other embodiments are described and claimed.

20 Claims, 3 Drawing Sheets

DEVICE, SYSTEM AND METHOD OF ACCESSING DATA STORED IN A MEMORY

FIELD

Some embodiments relate generally to the field of accessing a memory and, more particularly, to accessing data items retrieved by a direct memory access module.

BACKGROUND

Direct memory access (DMA) modules are known to perform read and write operations that allow data to be transferred to or from a memory without the need for a processor to be active in the transfer operation, thereby freeing the processor to perform other tasks. Accordingly, the processor can initiate a data transfer and then perform other tasks while the transfer is performed by the DMA module. The processor will then receive an interrupt from the DMA module once the transfer is complete. However, in modern systems, the DMA operations have to serve multiple central processing units (CPUs) and/or software threads. Each such thread can ask for service at any time. Accordingly, the situation can arise in which several threads request either the same or overlapping data or data. Also, the data may already been uploaded and so may reside in internal ram. Managing these requests efficiently is important. It is especially important to prevent uploading the same data twice. It is also important to ensure that different data is not written to the same external storage location. To solve these problems, a centralized management function is needed to determine for each DMA request whether requested data is already in a local cache or memory and where that data might reside. If the data is not in local cache or memory, then where to put it in internal storage (i.e., where to cache the data so that it will be accessible the next time it is required). The presently disclosed method presents such a centralized management function and an apparatus for implementing this function.

SUMMARY

Some embodiments of the disclosed method and apparatus include devices, systems, and methods for accessing data stored in a memory. In some of the disclosed embodiments, a data access device includes a processor capable of accessing a first memory. The device also includes a Direct-Memory-Access (DMA) module to transfer a plurality of data items to be processed by the processor, wherein the data items are transferred from a second memory to a first memory. In one embodiment, the processor and first memory are implemented as part of an Integrated Circuit (IC), while the second memory includes an "external memory" separate from the IC. In alternative embodiments, the processor and the first memory are implemented as discrete components. In yet another alternative embodiment, the second memory may be included in the IC that includes the processor and the first memory. In yet other embodiments, the processor, first memory and second memory are combined in other combinations and configurations.

In some embodiments, the data access device includes a combined software-hardware acceleration scheme to efficiently manage access to a plurality of data items. The acceleration scheme includes a cache manager. The cache manager manages a cache within a first memory. The cache includes a plurality of pointer entries. Each pointer entry includes an identifier of a respective data item and a pointer to an address of the data item. In one such embodiment, the first memory also includes a search module. The search module receives an identifier of a requested data item from the cache manager. The searcher then searches through the plurality of pointer entries for the identifier. If the identifier of the requested data item is detected, then the searcher provides the cache manager with the pointer to the address of the data item.

In one embodiment, the data items include a plurality of contexts. The contexts include information corresponding to a plurality of data packets. Each of the identifiers of the data items includes a flow identifier.

In one embodiment, the cache manager is implemented by software executed by the processor. Alternatively, the cache manager is implemented by software executed by a dedicated process. In yet another embodiment, such software is executed by a second processor that also executes other functions unrelated to the cache manager. In one such embodiment, the search module is implemented by suitable hardware capable of searching the cache without affecting the processing resources of the processor. In an alternative embodiment, the search module is implemented by software executed by a second processor which may either be dedicated to the search module or which also performs functions unrelated to the search module.

In some embodiments, the search module includes one or more input registers, wherein the cache manager stores the identifier of the requested data item and one or more search parameters in the input registers. The search module also includes one or more output registers accessible by the cache manager. The search module further includes a searcher to search the plurality of entries for the identifier of the requested data item based on the search parameters, and store the pointer from the detected entry in the output registers.

In some embodiments, the searcher stores, in the output registers, an indication of an address of an empty entry in the cache.

In some embodiments, the search parameters include at least one of the group including the length of the identifiers, the maximum number of entries in the cache, the size of the entries, an indication of a first address of the cache, the size of the cache, and an indication of a last address of the cache.

In some embodiments, the cache manager initializes the cache by storing an empty-address identifier in each entry of the cache.

In some embodiments, the cache manager provides the search module with the empty-address identifier. The search module provides the cache manager with an address of an entry in the cache, which includes the empty-address identifier.

In some embodiments, the cache manager adds a pointer entry to the cache by replacing the empty-address identifier with the pointer entry.

In some embodiments, the data access device includes a direct-memory-access module to import into the memory at least one data item from another memory. The cache manager adds at least one pointer entry to the cache, the pointer entry pointing to the at least one data item.

In some embodiments, the data access device includes a system-on-chip. For example, the system-on-chip includes a communication network gateway system-on-chip. The plurality of data items includes information related to a plurality of communication packets.

Some embodiments include a method including: (1) storing a plurality of data items in a memory, the data items to be accessed by a processor; (2) managing a cache in the memory, the cache including a plurality of pointer entries, wherein each pointer entry includes an identifier of a respective data item and a pointer to an address of the data item; (3) searching the plurality of pointer entries for an identifier of a requested data item; and (4) if a pointer entry is detected to include an identifier of a respective data item that matches the identifier of the requested data item then, providing the pointer from the detected entry.

In some embodiments, the managing includes using software executed by the processor, and the searching includes using hardware.

In some embodiments, the method includes storing the requested identifier and one or more search parameters in one or more input registers, wherein the includes searching the plurality of entries for the identifier of the requested data item based on the search parameters, and wherein the providing includes storing the pointer from the detected entry in one or more output registers.

In some embodiments, the method includes storing in the output registers an indication of an address of an empty entry in the cache.

In some embodiments, the method includes initializing the cache by storing an empty-address identifier in each entry of the cache.

In some embodiments, the method includes detecting an address of an entry in the cache, which includes the empty-address identifier.

In some embodiments, the method includes adding a pointer entry to the cache by replacing the empty-address identifier with the pointer entry.

In some embodiments, the method includes importing into the memory at least one data item from another memory; and adding at least one pointer entry to the cache, the pointer entry pointing to the at least one data item.

Some embodiments provide other and/or additional benefits and/or advantages.

BRIEF DESCRIPTION OF THE DRAWINGS

For simplicity and clarity of illustration, elements shown in the figures have not necessarily been drawn to scale. Furthermore, reference numerals repeated among the figures are associated with the same element in each such figure. The figures are listed below.

DETAILED DESCRIPTION

In the following detailed description, numerous specific details are set forth in order to provide a thorough understanding of some demonstrative embodiments of the disclosed method and apparatus. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing, terms such as, for example, "processing", "computing", "calculating", "determining", "establishing", "analyzing", "checking", or the like, refer to operation(s) and/or process(es) that can be performed by a computer, a computing platform, a computing system, or other electronic computing device for manipulating and/or transforming data into other data. Such data may be represented as physical (e.g., electronic) quantities within the computer's registers and/or memories or within other information storage medium. Such registers, memories and information storage medium can (but need not) also store instructions to perform operations and/or processes.

The term "plurality" as used herein means two or more.

The disclosed embodiments may be used in conjunction with various devices and systems, for example, Personal Computers (PCs), servers, Personal Digital Assistants (PDAs), wireless communication devices, wireless Access Points (APs), and networking devices (whether wired or wireless). It will be understood by those skilled in the art that this is a brief list of the devices in or with which the disclosed embodiments may be used.

Although not limited in this respect, the term "integrated circuit" (IC), as used herein refers to any suitable microcircuit, microchip, hybrid integrated circuit, digital integrated circuit and/or any other suitable electronic circuit, which includes, for example, a plurality of electronic devices manufactured in the surface of a thin substrate.

Although not limited in this respect, the term "system on chip" (SoC), as used herein refers to a substrate on which a plurality of modules and/or components of a system reside.

Figure 1:
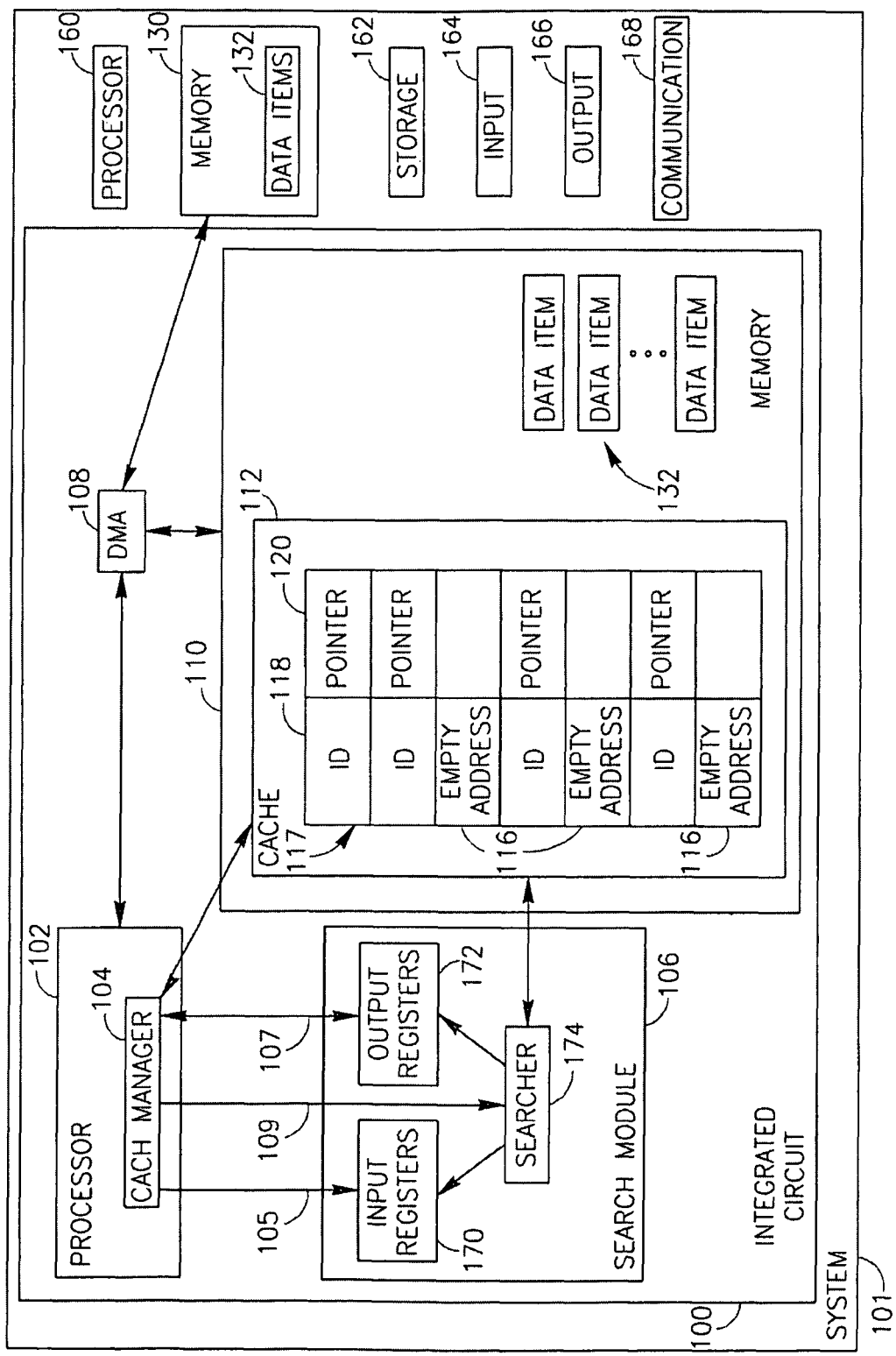
FIG. 1 is a schematic block diagram illustration of a system in accordance with some demonstrative embodiments.

FIG. 1 is a block diagram that illustrates a system 101 including an IC 100. In some demonstrative embodiments, the IC 100 is included within or is a SoC. In some embodiments, the IC 100 is implemented as part of a networking device. In one embodiment, the IC 100 includes or is a communication network gateway SoC, e.g., capable of converting protocols among communications networks, e.g., in accordance with the industry standard prepared and distributed by the Multimedia over Coax Alliance (MoCA®).

In some embodiments, the system 101 is a computing, communication and/or networking system. In one embodiment, in addition to the IC 100, the system 101 includes a processor 160, a memory unit 130, a storage unit 162, an input unit 164, an output unit 166, and a communication unit 168. It will be understood by those skilled in the art that in an alternative embodiment, the system 101 includes any suitable hardware and/or software units or devices necessary to perform additional functions of the system. In one embodiment, the processor 160 includes any one or more of the following: a central processing unit (CPU), a DSP, a microprocessor, a controller, a host processor, a plurality of processors or controllers, or any other suitable multi-purpose or specific purpose processor or controller. The memory unit 130 is any device capable of retaining information, for example, a RAM, a ROM, a DRAM, a SD-RAM, a flash memory, a volatile memory, a non-volatile memory, a cache memory, a buffer, a short term memory unit, a long term memory unit, or other suitable memory units or storage units. In one embodiment, access to the memory unit 130 is faster than access to the storage unit 162. However, in an alternative embodiment, either the memory unit 130 and the storage unit 162 are the same or access to the storage unit 162 is faster.

In one embodiment, the storage unit 162 includes, for example, a hard disk drive, a floppy disk drive, a compact disk (CD) drive, a CD-ROM drive, a digital versatile disk (DVD) drive, or other suitable removable or non-removable storage units. The input unit 164 includes, for example, a keyboard, a keypad, a mouse, a touch-pad, a stylus, a microphone, or other suitable pointing device or input device. However, it will be understood by those skilled in the art that any device for allowing data to be entered into the system 101 is within the scope of this disclosure. The variety of such devices is so great as to make expressly listing all such devices impractical. The output unit 166 includes, for example, a cathode ray tube (CRT) monitor or display unit, a liquid crystal display (LCD) monitor or display unit, a screen, a monitor, a speaker, or other suitable display unit or output device. The communication unit 168 includes, for example, a network interface card (NIC), a modem, a receiver and/or transmitter, a transmitter-receiver and/or transceiver, a radio frequency (RF) communication unit or transceiver, or other units able to transmit and/or receive communications over a communication network. Such devices can be either wired or wireless. As is the case for the input devices, the large number and variety of memory, storage, output and communications devices make it impractical to expressly list all such devices. It will be understood by those skilled in the art that the lists herein are provided simply to provide context to the reader.

In some embodiments, the IC 100 includes a processor 102, a memory 110 associated with the processor 102, and a Direct-Memory-Access (DMA) module 108. The DMA module 108 transfers information from the memory 130 to the memory 110, including a plurality of data items 132 to be processed by the processor 102. In one embodiment, the memory 110 is, or includes, a Static RAM (SRAM). In other embodiments, the memory 110 is, or includes, any other suitable memory means.

In some embodiments, the IC 100 includes a combined software-hardware acceleration scheme to efficiently manage and/or to accelerate the access of the processor 102 to the plurality of data items 132, as described in detail below. Alternatively, the IC 100 includes an acceleration scheme that is completely performed by software or an acceleration scheme that is completely performed in hardware.

In some embodiments, the IC 100 includes a cache manager 104 to manage a cache 112 within the memory 110. Alternatively, the cache manager 104 resides outside the IC 100. The cache 112 includes a plurality entries 116, 117. Some of the entries are pointer entries 117, others are empty entries 116. Each pointer entry 117 contains an identifier (ID) 118 and a pointer 120. Each ID 118 is associated with a respective data item 132. The pointer 120 contained within the entry 117 points to the data item 132 associated with the ID 118. Accordingly, each pointer 120 provides the address in the memory 110 of the respective data item 132. In one embodiment, entries 117 may be arranged in the form of a table such that, for example, each pointer entry 117 is stored in a respective entry of the table. Alternatively, the ID 118 and the pointer 120 are associated with one another by a mapping from the ID 118 to the pointer 120. Accordingly, it should be understood that any means whereby finding an ID 118 enables a determination of the value of the address of the data entry would be within the scope of this disclosure.

In one embodiment, empty entries 116 are essentially the same as pointer entries, however, an empty-address identifier is written into the ID 118 and the pointer 120 is set, for example, to all zeros.

In some embodiments, the entry 117 optionally includes additional information, such as management information to be used by the cache manager 104. In one embodiment, the management information may include information indicating whether or not the entry 117 is to be deleted if, for example, the cache 112 is full.

In some embodiments, the IC 100 includes a search module 106. Alternatively the search module resides outside the IC 100. In either case, the search module 106 receives an identifier ("the requested identifier") from the cache manager 104. The requested identifier is associated with a data item 132 ("the requested data item"). The requested data item is typically a piece of information that the processor 102 needs to perform an operation or task. The search module 106 searches the entries 117 for the requested identifier. If a pointer entry 117 including the requested identifier is detected, the search module 106 provides the cache manager 104 with the pointer 120 contained in the detected pointer entry 117.

In some embodiments, the cache manager 104 is implemented by software executed by the processor 102. For example, the memory 110 may store a computer-readable program which, when executed by the processor 102, results in performing the functionality of the cache manager 104. Alternatively, the cache manager 104 may be implemented by hardware or software called on by the processor 102.

In one embodiment, the search module 106 is implemented by suitable hardware capable of searching the cache 112 without using and/or affecting the processing resources of the processor 102, e.g., as described below. Alternatively, the search module 106 is implemented by software executed by a dedicated processor. In yet another embodiment, the search module 106 is implemented by software executed in a processor other than the processor 102 that performs more than just the search module functions.

In some embodiments, the search module 106 includes one or more input registers 170 accessible by the cache manager 104, one or more output registers 172 accessible by the cache manager 104, and a searcher 174. Alternatively, other means are used to transfer information into and out of the search module 106. In one embodiment, the cache manager 104 uses a write operation 105 to store information in the input registers 170. The information includes the requested identifier and one or more search parameters. The requested identifier and search parameters are related to one or more of the cache 112, the IDs 118, and/or the pointers 120. In one embodiment, the search parameters include a mask parameter, an empty-address identifier, and one or more cache-related parameters defining the cache 112. The mask parameter includes, for example, the size of the ID 118 (typically provided as a number of bits) and/or any other suitable information to define the portion of the entries 117 being sought. In one embodiment, the ID 118 is the portion of the entries 117 being sought. However, in an alternative embodiment, the ID 118 may be just a portion of the information used to identify the entry being sought.

The empty-address identifier is, for example, a predefined string that can be stored in the entry where the ID 118 would otherwise reside to indicate that the entry is empty, e.g., as described below. The cache-related parameters include, for example, the maximum number of entries in the cache 112, the size ("width" in bits) of each of the entries in the cache 112, and the like.

In one embodiment, the entries 117 are up to 64 bits wide, of which the ID 118 is 40 bits wide, and the pointer 120 is 24 bits wide. For example, the requested identifier may include a string having a size of up to 40 bits, the mask parameter may indicate that the ID 118 is maintained between bits 0 and 39 of the entry 117, and the cache related parameters define a width of 64 bits. In other embodiments, the pointer entries 117 may have any other suitable size, for example, 8 bits, 16 bits, 32 bits, or greater than 64 bits.

In some embodiments, the cache manager 104 activates the searcher 174 using a "start" signal 109 to start the search for the entries 117 that contain the requested identifier.

Alternatively, the cache manager 104 writes to a particular location in the input registers to activate the search process. In one embodiment, the search is based on the search parameters. Alternatively, the searcher 174 searches directly for the ID 118. It should be noted that the ID 118 can be considered to be one of the search parameters.

In the embodiment shown in FIG. 1, the searcher 174 stores result information regarding the results of the search in the output registers 172. Alternatively, the results may be directly output without storage in an output register. The cache manager 104 uses a read operation to read the result information from the output registers 172 over a connection 107 between the cache manager 104 and the output registers 172. The searcher 174 may delay the read operation, for example, until the searcher 174 completes the search of the cache 112.

In one embodiment, if an entry 117 that contains the requested identifier is detected, the searcher 174 stores the pointer 120 contained in that entry 117 in an output register 172. Additionally or alternatively, the searcher 174 also stores an address of the pointer 120 in the output registers 172. In one embodiment, the searcher 174 also stores in the output registers 172 an address of an empty entry 116 of the cache 112 including the empty-address identifier. The empty entry 116 may be filled with an ID 118 and pointer 120 associated with a new data item 132 that has been transferred from memory 130, e.g., as described below. Accordingly, a new pointer entry 117 will have been generated from the previously empty entry 116 so filled.

In some embodiments, the processor 102 may use the pointer 120 stored in the output registers 172 to access the requested data item in the memory 110.

In some embodiments, the cache manager 104 removes the pointer entry 117 once the processor 102 accesses and/or processes a data item 132 corresponding to that pointer entry 117, or once the data item 132 is deleted from the memory 110. In one such embodiment, the cache manager 104 converts the pointer entry 117 into an empty entry 116 and stores an empty-address identifier in the ID 118 of the empty entry 116. Alternatively, the pointer entry 117 can be filled with other data or the old ID 118 and pointer 120 left in the pointer entry 117.

In some embodiments, the searcher 174 stores a predefined indicator in the output registers 172. For example, a codeword can be stored in the output registers 172 if the searcher 174 does not detect the requested identifier in the cache 112. Upon reading the codeword, the cache manager 104 causes the DMA module 108 to transfer the requested data item 132 from the memory 130 to the memory 110. The cache manager 104 may also replace the empty-address identifier in the empty entry 116 with the contents of a pointer entry 117 corresponding to the added data item 132 (i.e., the ID 118 and pointer 120 associated with that data item 132). Accordingly, the processor 102 may later access the added data item 132 based on the added pointer entry 117 in the cache 112.

In one embodiment, the data items 132 include a plurality of contexts. Each context includes information corresponding to an associated data packet handled and/or processed by IC 100. For example, the context includes information about the channel over which the data packet is to be communicated. In one embodiment, the ID 118 includes a flow identifier ("flow ID"). The flow ID includes, for example, a value that is associated with a particular set of data packets that are being transmitted as one "flow", and which are associated with a particular context. The requested identifier includes the flow ID corresponding to the requested data item 132. In other embodiments, the data items 132, the ID 118 and the requested identifier may include any other suitable information.

In some embodiments, the cache manager 104 initializes the cache 112 by storing an empty-address identifier in each entry of the cache 112, for example, before any data items 132 are transferred to the memory 110. When the processor 102 needs a data item 132, that data item 132 will initially reside in the memory 130. In response to a first request from the cache manager 104 in the processor 102 for the first data item 132, the searcher 174 stores the address of the first empty entry 116 of the cache 112 in the output registers 172. The cache manager 104 instructs the DMA module 108 to transfer the first data item 132 from the memory 130 to the memory 110. The cache manager 104 replaces the empty-address identifier in the first empty entry 116 of the cache 112 with the values contained in the pointer entry 117 corresponding to the first data item 132 (i.e., the ID 118 associated with the data item 132 and the pointer 120 to the location of the data item 132 in the memory 110). In response to a second request from the cache manager 104 for a second data item 132, the searcher 174 will store the address of the second entry of the cache 112 in the output registers 172. The cache manager 104 will instruct the DMA module 108 to transfer the second data item 132 from the memory 130 to the memory 110. The cache manager 104 will also replace the empty-address identifier in the second empty entry 116 of the cache 112 with the values contained in the second pointer entry 117 corresponding to the second data item 132. This process can be repeated until the cache 112 is full.

In some embodiments, the searcher 174 may store an indication in the output registers 172 that the cache 112 is full. For example, the searcher 174 may not detect an empty-address identifier in the cache 112. In one such embodiment, upon reading from the output registers 172 the indication that the cache 112 is full, the cache manager 104 increases the capacity of the cache 112 by adding one or more empty entries 116 to the cache 112. In another embodiment, the cache manager 104 may delete one or more of the pointer entries 117 from the cache 112 in order to create one or more empty entries 116.

According to the embodiment shown in FIG. 1 the entries 116 and 117 may be interleaved. For example, the cache 112 may be initialized by storing the pointers 117 in each entry of the cache 112; the plurality of pointer entries may be stored in cache 112 according to any suitable order: and/or one or more of the pointer entries may be deleted and replaced with the empty entries 116, resulting in the entries 116 and 117 being interleaved. However, it will be appreciated that the empty entries 116 and the pointer entries 117 may be arranged within the cache 112 in any other suitable order. For example, all the pointer entries 117 may be grouped together in at least one cluster, e.g., at the beginning of the cache 112. The empty entries 116 follow the last of the pointer entries 117.

Figure 2:
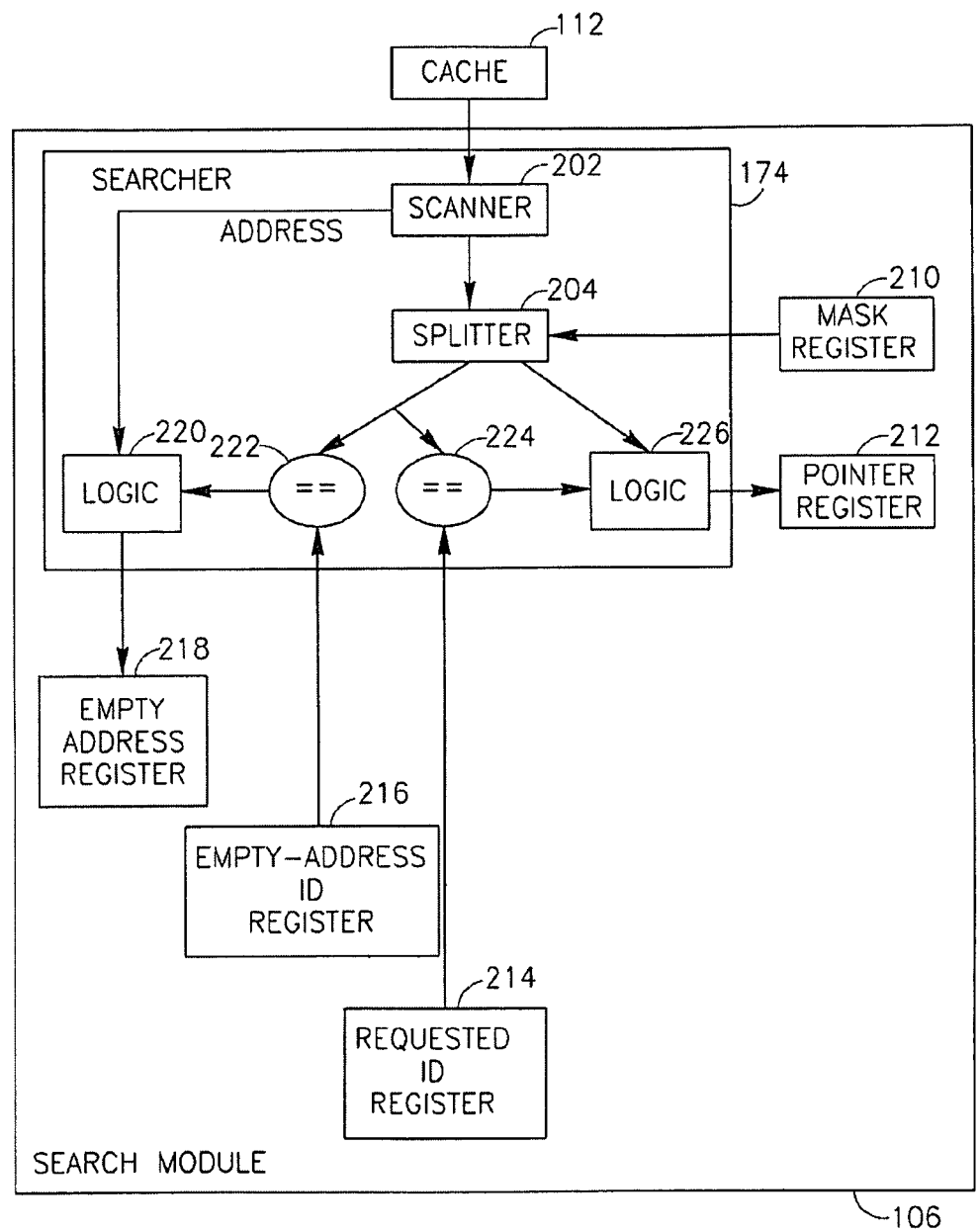
FIG. 2 is a schematic block illustration of a search module in accordance with some demonstrative embodiments.

FIG. 2 illustrates the search module 106 shown in FIG. 1 in accordance with some embodiments.

In the embodiment shown in FIG. 2, the input registers 170 shown in FIG. 1 include: (1) a mask register 210 to store the mask parameter; (2) a requested ID register 214 to store the requested identifier; and (3) an empty address ID input register 216 to store the empty-address identifier. The output registers 172 shown in FIG. 1 include: (1) a pointer register 212 to store the pointer 120 (shown in FIG. 1) corresponding to the requested identifier; and (2) an empty address output register 218 to store the address of the empty entry 116 (shown in FIG. 1) including the empty-address identifier.

In the embodiment shown in FIG. 2, the searcher 174 includes: (1) a scanner 202; (2) a splitter 204; (3) a first comparator 224; (4) a second comparator 222; (5) a first logic module 226; and (6) a second logic module 220. The scanner 202 scans the entries 116, 117 (shown in FIG. 1) of the cache 112 and outputs the scanned entry 116, 117. The entries 116, 117 can be scanned either one by one or according to any other suitable scanning scheme. The splitter 204 splits the ID 118 (shown in FIG. 1) from the pointer 120 (shown in FIG. 1). The splitter 174 splits the entry 116, 117 based, for example, on the mask parameter of the mask register 210. For example, the entry 116, 117 may include 64 bits, and the splitter 204 splits the entry 116, 117 into the ID 118, which includes the first 40 bits of the entry 116, 117, and pointer 120, which includes the other 24 bits of the entry 117. It should be noted that in one embodiment, if the entry is an empty entry 116, then the value of the pointer 120 will be all zeros.

The first comparator 224 compares the ID 118 to the requested identifier from the requested ID register 214. The logic module 226 stores the pointer 120 in the pointer register 212 if, for example, the ID 118 is equal to the requested identifier.

The second comparator 222 compares the ID 118 to the empty-address identifier contained in the empty address ID input register 216. The second logic module 220 stores the address of at least one empty entry 116 for example a first empty entry 116, which is detected by the second comparator 222 in the empty-address identifier.

Figure 3:
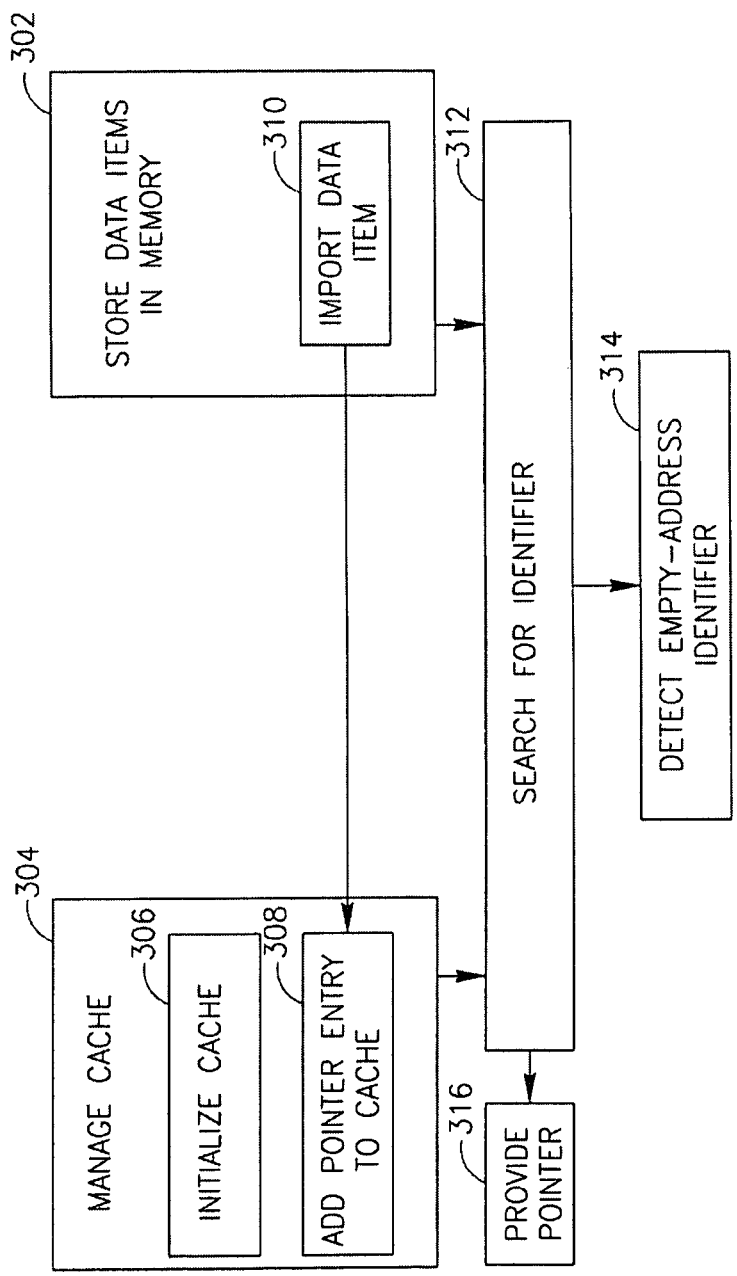
FIG. 3 is a schematic flow-chart illustration of a method of accessing data stored in a memory in accordance with some demonstrative embodiments.

FIG. 3 schematically illustrates a method of accessing data stored in a memory. In some embodiments one or more operations of the method of FIG. 3 may be performed by one or more elements of the IC 100 shown in FIG. 1, e.g., the cache manager 104 shown in FIG. 1, and/or the search module 106 shown in FIG. 1 to access the data items 132 stored in the memory 110 shown in FIG. 1.

As indicated at block 302, the method includes storing in a memory a plurality of data items to be accessed by a processor. For example, the data items 132 may be stored in the memory 110, as described above with reference to FIG. 1.

As indicated at block 304 the method may include managing a cache in the memory. The cache including a plurality of pointer entries, wherein each pointer entry includes an identifier of a respective data item and a pointer to an address of the data item. For example, the cache manager 104 may manage the cache 112, as described above with reference to FIG. 1.

As indicated at block 306, the method may include initializing the cache by storing an empty-address identifier in each entry of the cache. For example, the cache manager 104 initializes the cache 112 by storing the empty-address identifier in each entry of the cache 112, as described above with reference to FIG. 1.

As indicated at block 310, the method may include importing into the memory at least one data item from another memory. For example, the DMA 108 may import the data item from memory 130, as described above with reference to FIG. 1.

As indicated at block 308, the method may include adding to the cache at least one pointer entry pointing to the at least one data item, respectively. For example, the cache manager 104 adds to the cache 112 the pointer entry 117 pointing to the added data item 132, as described above with reference to FIG. 1.

As indicated at block 312, the method may include searching the cache for an identifier of a requested data item. For example, the searcher 174 searches the cache 112 for the identifier written by the cache manager into the input registers 170, as described above with reference to FIG. 1.

As indicated at block 316, if an entry including the requested identifier is detected, the method may include providing a pointer included in the detected entry. For example, the searcher 174 stores in the output registers 172 the pointer 120 from the detected entry, as described above with reference to FIG. 1.

In some embodiments, the managing includes using software executed by the processor, and the searching includes using hardware. For example, the method may include storing in one or more input registers the requested identifier and one or more search parameters including one or more of a bit-length of the identifiers, a maximal number of entries in the cache, a bit-size of the plurality of entries, an indication of a first address of the cache, a size of the cache, and an indication of last address of the cache. The searching includes, for example, searching the plurality of pointer entries for the requested identifier based on the search parameters. The providing includes storing the pointer in one or more output registers, as described above.

As indicated at block 314, the method may include detecting an address of an entry in the cache, which includes the empty-address identifier. For example, the method may include storing in the output registers an indication of an address of the detected entry. In one embodiment, adding the pointer entry to the cache includes storing the pointer entry in the detected entry.

Some portions of the disclosed apparatus are entirely embodied in hardware. Other portions are entirely embodied in software, which includes but is not limited to firmware, resident software, microcode, or the like. Still other portions include both hardware and software elements.

Furthermore, some portions of the disclosed apparatus take the form of a computer-usable or computer-readable medium providing program code for use by or in connection with a computer or any instruction execution system. A computer-usable or computer-readable medium is or includes anything that can contain, store, communicate, propagate, or transport the program for use by or in connection with an instruction execution system, apparatus, or device.

Some examples of a computer-readable medium include a propagation medium, an electronic, magnetic, optical, electromagnetic, infrared, or semiconductor system (or apparatus or device). Some such systems include (or are) a semiconductor or solid state memory, magnetic tape, a removable computer diskette, a random access memory (RAM), a read-only memory (ROM), a rigid magnetic disk, and an optical disk. Some examples of optical disks include compact disk-read only memory (CD-ROM), compact disk-read/write (CD-R/W), and DVD.

In some embodiments, a data processing system suitable for storing and/or executing program code includes at least one processor coupled directly or indirectly to memory elements, for example, through a system bus. The memory elements include, for example, local memory employed during actual execution of the program code, bulk storage, and cache memories which may provide temporary storage of at least some program code in order to reduce the number of times code must be retrieved from bulk storage during execution.

Functions, operations, components and/or features described herein with reference to one or more embodiments, may be combined with, or may be utilized in combination with, one or more other functions, operations, components and/or features described herein with reference to one or more other embodiments, or vice versa.

While certain features of embodiments of the invention have been illustrated and described herein, many modifications, substitutions, changes, and equivalents may occur to those skilled in the art. It is, therefore, to be understood that the appended claims are intended to cover all such modifications and changes.

What is claimed is:

1. An apparatus comprising:
   a memory to store a plurality of data items to be accessed by a processor;
   a cache manager to manage a cache within the memory, wherein:
   the cache is distinct and separate from a remaining portion of the memory where the plurality of data items is stored; and
   the cache including a plurality of pointer entries, wherein each pointer entry includes an identifier of a respective data item and a pointer to an address of the data item; and
   a search module to:
   receive from the cache manager an identifier of a requested data item;
   search the plurality of pointer entries for the identifier of the requested data item; and
   only when a pointer entry is detected to include an identifier of a respective data item that matches the identifier of the requested data item then, provide the cache manager with the pointer from the detected entry.

2. The apparatus of claim 1, wherein the cache manager comprises a software cache manager executed by the processor, and wherein the search module comprises a hardware search module.

3. The apparatus of claim 1, wherein the search module comprises:
   one or more input registers, wherein the cache manager stores the identifier of the requested data item and one or more search parameters in the input registers;
   one or more output registers accessible by the cache manager; and
   a searcher to:
   search the plurality of entries for the identifier of the requested data item based on the search parameters; and
   store the pointer from the detected entry in the output registers.

4. The apparatus of claim 3, wherein the searcher stores, in the output registers, an indication of an address of an empty entry in the cache.

5. The apparatus of claim 3, wherein the search parameters include at least one of the group including the length of the identifiers, the maximum number of entries in the cache, the size of the entries, an indication of a first address of the cache, the size of the cache, and an indication of a last address of the cache.

6. The apparatus of claim 1, wherein the cache manager initializes the cache by storing an empty-address identifier in each entry of the cache.

7. The apparatus of claim 6, wherein the cache manager provides the search module with the empty-address identifier, and wherein the search module provides the cache manager with an address of an entry in the cache, which includes the empty-address identifier.

8. The apparatus of claim 7, wherein the cache manager adds a pointer entry to the cache by replacing the empty-address identifier with the pointer entry.

9. The apparatus of claim 1 comprising:
   a direct-memory-access module to import into the memory at least one data item from another memory,
   wherein the cache manager adds at least one pointer entry to the cache, the pointer entry pointing to the at least one data item.

10. The apparatus of claim 1 comprising a system-on-chip.

11. The apparatus of claim 10, wherein the system-on-chip comprises a communication network gateway system-on-chip, and wherein the plurality of data items include information related to a plurality of communication packets.

12. A method comprising:
    storing a plurality of data items in a memory, the data items to be accessed by a processor;
    managing a cache in the memory, wherein:
    the cache is distinct and separate from a remaining portion of the memory where the plurality of data items is stored; and
    the cache including a plurality of pointer entries, wherein each pointer entry includes an identifier of a respective data item and a pointer to an address of the data item;
    searching the plurality of pointer entries for an identifier of a requested data item; and
    only when a pointer entry is detected to include an identifier of a respective data item that matches the identifier of the requested data item then, providing the pointer from the detected entry.

13. The method of claim 12, wherein the managing comprises using software executed by the processor, and wherein the searching comprises using hardware.

14. The method of claim 12 comprising:
    storing the requested identifier and one or more search parameters in one or more input registers, wherein the searching comprises searching the plurality of entries for the identifier of the requested data item based on the search parameters, and
    wherein the providing comprises storing the pointer from the detected entry in one or more output registers.

15. The method of claim 14 comprising storing in the output registers an indication of an address of an empty entry in the cache.

16. The method of claim 14. wherein the search parameters include at least one of the group including the length of the identifiers, the maximum number of entries in the cache, the size of the entries, an indication of a first address of the cache, the size of the cache, and an indication of a last address of the cache.

17. The method of claim 12 comprising initializing the cache by storing an empty address identifier in each entry of the cache.

18. The method of claim 17 comprising detecting an address of an entry in the cache, which includes the empty-address identifier.

19. The method of claim 18 comprising adding a pointer entry to the cache by replacing the empty-address identifier with the pointer entry.

20. The method of claim 12 comprising:
    importing into the memory at least one data item from another memory; and adding at least one pointer entry to the cache, the pointer entry pointing to the at least one data item.

* * * * *